(12) United States Patent
Denker et al.

(10) Patent No.: US 6,254,106 B1
(45) Date of Patent: *Jul. 3, 2001

(54) DEVICE FOR SEALING A GAP

(75) Inventors: Ernst Denker, Westerkappeln; Martin Ebner, Deggendorf, both of (DE)

(73) Assignee: Fritsche Moellmann, GmbH & Co. KG, Lotte (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,461

(22) Filed: Nov. 30, 1998

(51) Int. Cl.$^7$ ...................................................... F16J 15/46
(52) U.S. Cl. ............................ 277/645; 277/646; 277/637
(58) Field of Search .................................... 277/646, 645, 277/637, 630, 641, 616; 403/31, 15, 288

(56) References Cited

U.S. PATENT DOCUMENTS

| | | | |
|---|---|---|---|
| 1,439,452 | * 12/1922 | Shaw | 277/646 |
| 3,178,779 | * 4/1965 | Clark | 277/646 |
| 3,501,868 | * 3/1970 | Ganzinotti | 277/637 |
| 3,642,291 | * 2/1972 | Zeffer | 277/630 |
| 4,227,702 | * 10/1980 | Thate | 277/637 |
| 4,394,022 | * 7/1983 | Gilmore | 277/641 |
| 5,353,695 | * 10/1994 | Ledet | 277/646 |
| 6,029,977 | * 2/2000 | Sym | 277/312 |

FOREIGN PATENT DOCUMENTS 296 00 582 U   4/1996 (DE).

* cited by examiner

*Primary Examiner*—Anthony Knight
*Assistant Examiner*—Mark Willams
(74) *Attorney, Agent, or Firm*—Milde, Hoffberg & Macklin, LLP

(57) ABSTRACT

A device for sealing a gap between two members. The device comprises at least one elastically expanding hose accommodated in a groove (2) in the wall of the gap. The hose can be expanded by a compressible fluid introduced through a rigid opening such that the hose cannot be displaced in relation to the opening. To provide a device that is easy to install and remove and that requires no straps to secure it, the hose (1) is inserted into the opening (3) and has one end loose and the other end secured by supports.

21 Claims, 2 Drawing Sheets

DEVICE FOR SEALING A GAP

BACKGROUND OF THE INVENTION

The present invention concerns a device for sealing a gap between two members to be sealed and comprising at least one elastically expanding hose accommodated in a groove in the wall of one member and expanded by a compressible fluid introduced through a rigid opening such that the hose cannot be displaced in relation to the opening.

A sealing device of this type is known from German utility patent No. GM 29 600 582. The fluid is supplied through a line inserted into the hose and attached to it by straps on its outer surface. The straps take up considerable space and often complicate installation.

SUMMARY OF THE INVENTION

A principal object of the present invention is accordingly to provide an improved device for sealing a gap which is easier to install and remove than the known sealing devices of this type and which requires no straps to secure it.

This object, as well as other objects which will become apparent from the discussion that follows, are achieved, in accordance with the present invention, in a gap sealing device with which the hose is inserted into the fluid-introduction opening with one end loose and which is secured therein by supports at the other end. The hose can expand elastically and is made of rubber for example.

The point of departure for the present invention is the recognition that a gap between two members can usually be pressurized only if the side of the groove facing the hose is closed by a rigid wall to prevent the hose from bulging out. The only result of the elastic expansion induced by introducing the compressed fluid into the hose will accordingly be to force the hose tightly against both the fluid-introduction opening and the wall that closes the open side of the groove. The hose will be forced outstandingly tightly against the opening without straps or other auxiliary means. Such a hose can easily be removed from the gap and replaced with another loose hose.

The aforesaid supports can be a separate component, a "false floor" extending across the groove for instance, or a component of the groove itself. Installation will in either case require no special tooling.

The hose will be particularly easy to secure if at least one end is inserted into a recess extending perpendicular to the longitudinal direction of the groove or the plane of the gap. Such a recess can, for example, be a bore that extends into the base of the groove by way of a rounded transition. To prevent specific overloading of the hose in the vicinity of the transition between the bore and the groove, and uncontrolled expansion in particular, it has proven practical for at least one end of the hose to be enclosed tightly in the vicinity of the rounding by an insert element that can be accommodated in another recess. Such an insert can be plastic or metal for example. If the insert is a resilient seal that can be brought into contact with the facing surface of the gap, it will be possible to seal the whole length of the gap even in the vicinity of any curvature. Another advantage of this approach is that the mid-section of the gap can be exploited to evacuate a mold even though the gap has been sealed in the vicinity of the inserts. For this purpose the mode is initially sealed and possibly loaded with molding mass as far as the gap. Any gases in the mold can escape through the gap ahead of time. The hose is then inflated and forced tightly against the facing surfaces of the gap walls between the inserts, sealing off the whole gap. The mold can then be pressurized.

The insert element can be provided with a communicating port to supply the compressible fluid through. It has proven practical in this event to thread the port to accept a supply line. It can extend at an angle to the fluid-introduction opening to simplify providing the fluid, which is preferably air.

To prevent the hose from escaping from the groove, when the base of the groove is above the bottom of the hose for instance, it has proven practical for the open side of the groove to be narrower and for at least the bottom of the hose to be wider.

A flexible but incompressible stiffener of appropriate cross-section can be accommodated loosely in the hose to prevent the hose from buckling even when curving around a short radius and to ensure extensive retention of its original shape. Such a stiffener can be a spiral or a plastic rod or tube that will support the main hose radially.

The present invention will now be described in detail with reference to the accompanying drawings.

DESCRIPTION OF THE PREFERRED EMBODIMENTS

Figure 1:
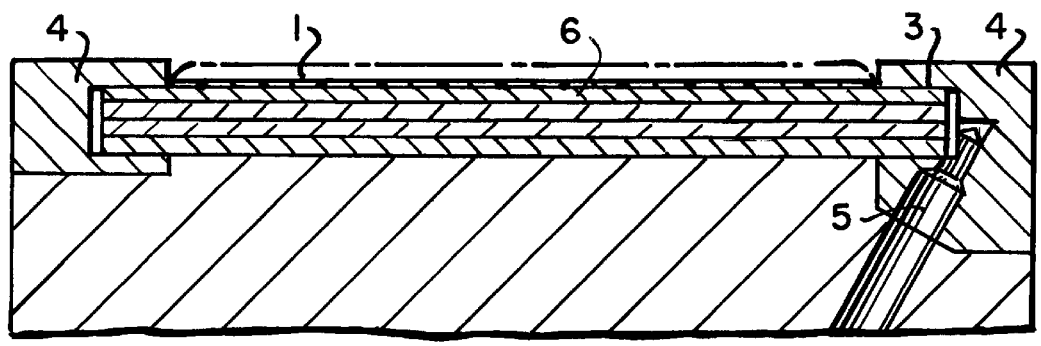
FIG. 1 is a cross-sectional view of a sealing device according to the invention that employs a straight hose.

The device illustrated in FIG. 1 is intended for sealing the gap between the upper and lower halves of a mold employed, for example, to produce plastic moldings. The starting materials, blends that react into expanded polyurethane for example, are usually injected liquid. In spite of the extreme precision with which the parts of the mold are manufactured, however, some material can still escape through the gap between the mold halves, resulting in defects in the molding and contamination of the environment. This situation can be counteracted by a sealing device in the gap. Such a device comprises an elastic hose 1 accommodated in a groove 2 in one of the mold halves. The hose 1 can be expanded by a compressible fluid introduced through a rigid opening 3. Although one end of the hose rests loosely against opening 3, one cylindrical section of which encloses it, and is secured at the other end only by supports, it will be accommodated tightly and immovably in the opening. The hose 1 can be expanded radially by compressed fluid introduced even while the mold is closed and accordingly forced tightly against the unillustrated base of the groove, preventing the fluid from escaping through the gap.

Once the material in the mold has solidified into a polymer, the hose is depressurized and recedes in its original as-manufactured shape back into the groove. The pressure against the base of the groove is accordingly eliminated and the mold can easily be opened without the hose escaping from the groove. Vacuum can be generated in the hose to accelerate regaining its original form.

Embedded in the hose 1 in the embodiment illustrated in FIG. 1 is a stiffener 6 in the form of a plastic rod. Its outside diameter can be almost equal to the inside diameter of the hose, decreasing the volume of fluid required for inflation. A hose provided with such a stiffener can also wrap around in a tightly curved configuration without buckling. The stiffener must obviously be flexible, and can for instance be made of a flexible but not compressible material, like rubber. It can be a spiral, rod, or tube for example.

Both ends of the hose 1 illustrated in FIG. 1 are secured in metal insert elements 4 accommodated immovably in first recesses in the mold. Inserts 4 can be plastic instead of metal. They allow precise demarcation of the sealed-off zone. Each end of the hose is supported axially to ensure precise placement in the cylindrical sealing section.

The insert element 4 on the right in FIG. 1 is provided with a communicating port 5 that slopes toward fluid introduction opening 3 and allows the fluid to be introduced into the hose at the least disruptive angle.

Figure 2:
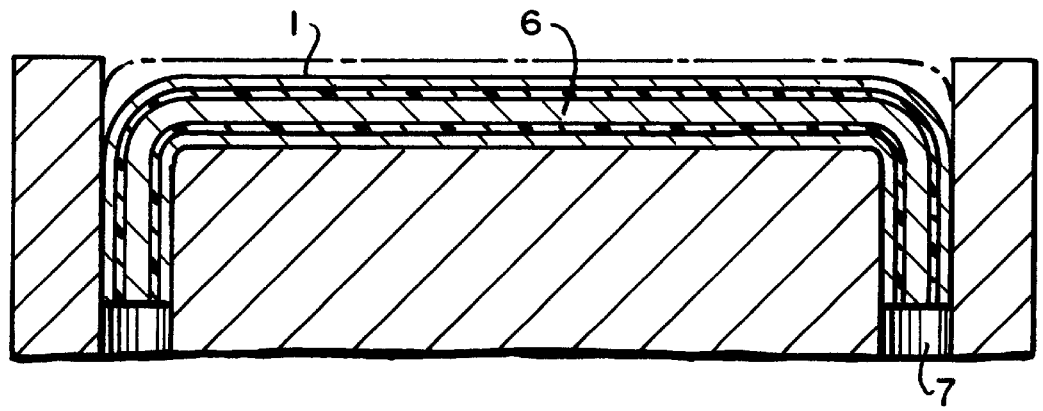
FIG. 2 is a cross-sectional view of a device, similar to the device illustrated in FIG. 1, that employs a hose bent across the groove at each end.

The embodiment illustrated in FIG. 2 functions very similarly to the one illustrated in FIG. 1. The ends of the hose, however, are inserted in second recesses 7 that extend across groove 2 and curve into it. The hose in this embodiment also accommodates an incompressible but flexible stiffener in the form of a spiraling tube of polyethylene, that prevents the hose from buckling where it enters recesses 7.

Figure 3:
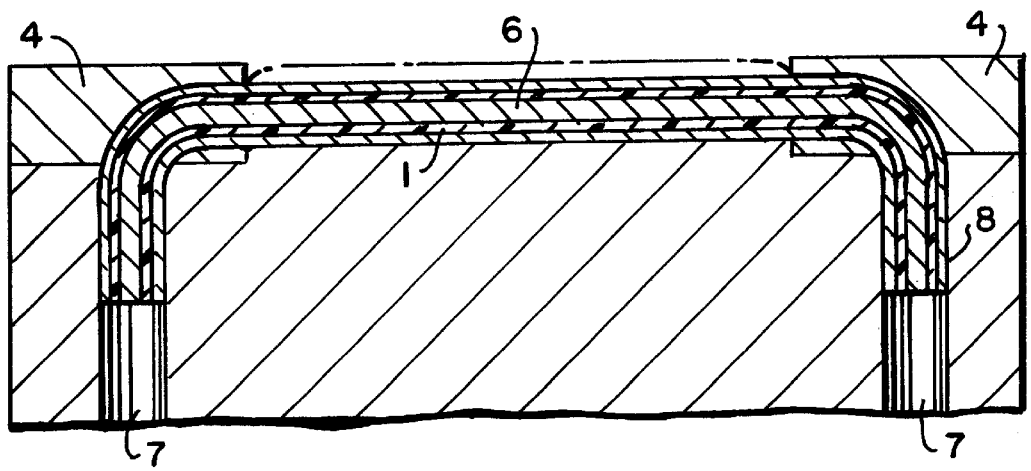
FIG. 3 is a cross-sectional view of a device, similar to the device illustrated in FIG. 2, wherein the bent section of the tube is accommodated in an insert element.

The sealing device illustrated in FIG. 3 is very similar to the aforesaid embodiments, although it is provided at its corners with resilient insert elements 4 of rubber or other elastomer. Inserts 4 are accommodated in first recesses and rest against the outside of the hose and support it and are forced tightly against the base of the groove. This system also prevents undesired deformation of the hose at the corners, especially too much expansion subsequent to the introduction of the fluid. Another advantage is the very precise expansion of hose 1 between the inserts 4, preventing air from escaping through the gap before the hose reaches the facing wall of the other mold half and rests tightly against it. Finally, pressure is allowed to build up inside the mold, which can improve the quality of the molding considerably. Neither end of the hose needs to be separately supported because the forces acting on it when expanded cancel one another out. The inserts are further forced against the opposing sealed surfaces of the gap as the hose inflates.

Figure 4:
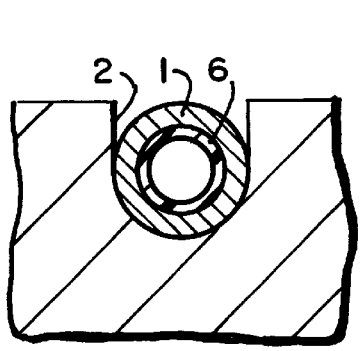
FIGS. 4 and 5 are cross-sectional views through sealing devices that employ hoses with differently shaped cross-sections.

FIG. 4 is a section through a sealing device with a cylindrical hose accommodating a stiffener 6 in the form of a spiral tube.

Figure 5:
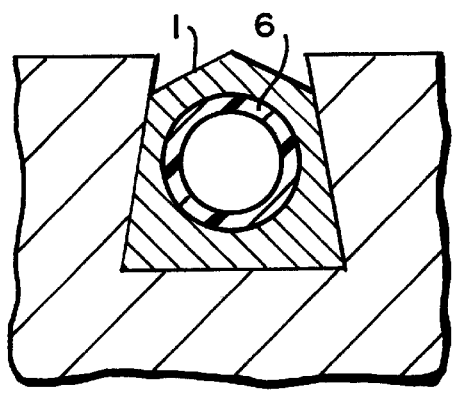

FIG. 5 is a section through a sealing device with a groove with a trapezoidal cross-section, open at its narrow side.

The hose has a similar cross-section and accommodates a stiffener in the form of a tube. Space between the inner surface of hose 1 and the outer surface of stiffener 6 allow the tube to be charged and discharged very rapidly, with compressed air for example. Since the hose is wedged into the groove, it cannot escape therefrom even when the system is upside down.

There has thus been shown and described a novel device for sealing a gap which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A device for sealing a gap between two members to be sealed, said device comprising at least one elastically expandable hose, accommodated loosely in a groove in one of the members and which is expandable by a fluid introduced through a first opening in said one of the members such that the hose cannot be displaced in relation to the first opening of the one member, wherein the one member further includes a recess retaining an insert element having a second opening, and wherein at least one end of the hose is inserted loosely into the second opening of the insert element.

2. The device in claim 1, wherein at least one end of the hose is inserted in an opening that extends perpendicular to the longitudinal direction of the groove.

3. The device defined in claim 1, wherein the insert element is a resilient seal that is engaged with the one member.

4. The device defined in claim 1, wherein the insert element has a port for introducing the fluid through.

5. The device defined in claim 4, wherein the port is threaded to accept a connection.

6. The device defined in claim 5, wherein the port slopes toward the opening.

7. The device defined in claim 1, wherein the groove has a base and an open side which is narrower than the base.

8. The device defined in claim 1, wherein the hose loosely accommodates a flexible but incompressible stiffener with a matching cross-section.

9. The device defined in claim 8, wherein the stiffener is formed of a structure selected from the group consisting of a spiral, a rod and a tube.

10. The device defined in claim 9, wherein the structure is made of plastic.

11. A device for sealing a gap between two members to be sealed, said device comprising at least one elastically expandable hose accommodated in a groove in one of the members, said groove having a base and an open side which is narrower than the base, which hose is expanded by a fluid introduced through a rigid opening in said one of the members such that the hose cannot be displaced in relation to the opening, wherein the hose is inserted into the opening and has one end loose and the other end secured by supports.

12. The device defined in claim 11, wherein the supports are a component of the groove.

13. The device defined in claim 11, wherein one end of the hose is inserted in an insert element that is retained in a first recess.

14. The device defined in claim 13, wherein the insert element is a resilient seal that is engaged with the opposing surface of the gap.

15. The device defined in claim 13, wherein the insert element has a port for introducing the fluid through.

16. The device defined in claim 15, wherein the port is threaded to accept a connection.

17. The device defined in claim 16, wherein the port slopes toward the opening.

18. The device defined in claim 12, wherein at least one end of the hose is inserted in a second recess that extends perpendicular to the longitudinal direction of the groove.

19. The device defined in claim 12, wherein the hose loosely accommodates a flexible but incompressible stiffener with a matching cross-section.

20. The device defined in claim 19, wherein the stiffener is a formed of a structure selected from the group consisting of a spiral, a rod and a tube.

21. The device defined in claim 20, wherein the stiffener is a formed of a structure selected from the group consisting of a spiral, a rod and a tube.

* * * * *